United States Patent
Spyrou et al.

(10) Patent No.: US 10,071,510 B2
(45) Date of Patent: Sep. 11, 2018

(54) COMPOSITE SEMIFINISHED PRODUCTS AND MOULDINGS PRODUCED THEREFROM AND DIRECTLY PRODUCED MOULDINGS BASED ON HYDROXY-FUNCTIONALIZED (METH)ACRYLATES AND URETDIONES WHICH ARE CROSSLINKED BY MEANS OF RADIATION TO GIVE THERMOSETS

(71) Applicants: Emmanouil Spyrou, Schermbeck (DE); Guenter Schmitt, Darmstadt (DE); Friedrich Georg Schmidt, Haltern am See (DE); Sandra Reemers, Muenster (DE); Birte Olland, Essen (DE); Michael Spittler, Duesseldorf (DE); Holger Loesch, Herne (DE)

(72) Inventors: Emmanouil Spyrou, Schermbeck (DE); Guenter Schmitt, Darmstadt (DE); Friedrich Georg Schmidt, Haltern am See (DE); Sandra Reemers, Muenster (DE); Birte Olland, Essen (DE); Michael Spittler, Duesseldorf (DE); Holger Loesch, Herne (DE)

(73) Assignee: EVONIK DEGUSSA GmbH, Essen (DE)

( * ) Notice: Subject to any disclaimer, the term of this patent is extended or adjusted under 35 U.S.C. 154(b) by 113 days.

(21) Appl. No.: 14/774,395

(22) PCT Filed: Feb. 26, 2014

(86) PCT No.: PCT/EP2014/053705
§ 371 (c)(1),
(2) Date: Sep. 10, 2015

(87) PCT Pub. No.: WO2014/139796
PCT Pub. Date: Sep. 18, 2014

(65) Prior Publication Data
US 2016/0023384 A1    Jan. 28, 2016

(30) Foreign Application Priority Data
Mar. 11, 2013 (DE) .................... 10 2013 204 124

(51) Int. Cl.
| | |
|---|---|
| B29C 43/00 | (2006.01) |
| B29C 70/50 | (2006.01) |
| C08G 18/67 | (2006.01) |
| C08J 5/24 | (2006.01) |
| C08G 18/79 | (2006.01) |
| C08G 18/80 | (2006.01) |
| C08F 290/06 | (2006.01) |

(Continued)

(52) U.S. Cl.
CPC ............ *B29C 43/003* (2013.01); *B29C 70/50* (2013.01); *C08F 290/067* (2013.01); *C08F 297/06* (2013.01); *C08G 18/672* (2013.01); *C08G 18/798* (2013.01); *C08G 18/8025* (2013.01); *C08J 3/24* (2013.01); *C08J 3/28* (2013.01); *C08J 5/043* (2013.01); *C08J 5/24* (2013.01); *B29K 2033/08* (2013.01); *B29K 2033/12* (2013.01); *C08J 2375/04* (2013.01); *C08J 2375/06* (2013.01)

(58) Field of Classification Search
CPC ........ B32B 17/04; B32B 27/04; B29C 43/003
See application file for complete search history.

(56) References Cited

U.S. PATENT DOCUMENTS

| | | | |
|---|---|---|---|
| 8,455,090 | B2 | 6/2013 | Schmidt et al. |
| 2005/0129859 | A1 | 6/2005 | Misev et al. |

(Continued)

FOREIGN PATENT DOCUMENTS

| | | |
|---|---|---|
| CN | 1646572 A | 7/2005 |
| CN | 102906140 A | 1/2013 |

(Continued)

OTHER PUBLICATIONS

International Search Report dated Apr. 16, 2014, in PCT/EP2014/053705 filed Feb. 26, 2014.
U.S. Appl. No. 13/978,059, filed Aug. 21, 2013, US-2013-0323993 A1, Guenter Schmitt et al.
U.S. Appl. No. 14/360,442, filed May 23, 2014, US-2014-0323001 A1, Friedrich Georg Schmidt et al.
U.S. Appl. No. 13/256,394, filed Sep. 13, 2011, US2012/0003891 A1, Schmidt, et al.
U.S. Appl. No. 13/973,425, filed Aug. 22, 2013, US2014/0065911 A1, Schmidt, et al.
U.S. Appl. No. 13/695,652, filed Nov. 1, 2012, US2013/0045652 A1, Schmidt, et al.

(Continued)

Primary Examiner — Peter D Mulcahy
(74) Attorney, Agent, or Firm — Oblon, McClelland, Maier & Neustadt, L.L.P.

(57) ABSTRACT

The invention relates to a process for producing storage-stable polyurethane prepregs and to moldings (composite components) produced therefrom. The prepregs and, respectively, components are produced by mixing (meth)acrylate monomers, (meth)acrylate polymers, hydroxy-functionalized (meth)acrylate monomers and/or hydroxy-functionalized (meth)acrylate polymers with uretdione materials. Photoinitiators can also optionally be added. This mixture or solution is applied by known processes to fiber material, e.g. carbon fibers, glass fibers or polymer fibers, and is polymerized with the aid of radiation or of plasma methods. Polymerization, e.g. at room temperature or at up to 80° C., gives thermoplastics or thermoplastic prepregs, and these can subsequently also be subjected to forming processes. The hydroxy-functionalized (meth)acrylate constituents can then be crosslinked with the uretdiones already present within the system, by use of elevated temperature. It is thus possible to produce dimensionally stable thermosets or dimensionally stable crosslinked composite components.

15 Claims, No Drawings

(51) Int. Cl.
*C08F 297/06* (2006.01)
*C08J 3/24* (2006.01)
*C08J 3/28* (2006.01)
*C08J 5/04* (2006.01)
*B29K 33/00* (2006.01)

(56) References Cited

U.S. PATENT DOCUMENTS

| | | |
|---|---|---|
| 2008/0255308 A1 | 10/2008 | Austrup et al. |
| 2012/0003891 A1 | 1/2012 | Schmidt et al. |
| 2013/0045652 A1 | 2/2013 | Schmidt et al. |
| 2013/0230716 A1 | 9/2013 | Schmidt et al. |
| 2013/0231017 A1 | 9/2013 | Schmidt et al. |
| 2013/0231022 A1 | 9/2013 | Schmidt et al. |
| 2013/0303042 A1 | 11/2013 | Schmidt et al. |
| 2013/0323993 A1 | 12/2013 | Schmitt et al. |
| 2014/0065911 A1 | 3/2014 | Schmidt et al. |
| 2014/0087613 A1 | 3/2014 | Spyrou et al. |
| 2014/0179187 A1* | 6/2014 | Restuccia ............... C08L 63/00 442/149 |
| 2014/0323001 A1 | 10/2014 | Schmidt et al. |

FOREIGN PATENT DOCUMENTS

| | | |
|---|---|---|
| DE | 10 2010 029 355 A1 | 12/2011 |
| JP | 2007-510763 A | 4/2007 |
| WO | WO 2012/093006 A1 | 7/2012 |

OTHER PUBLICATIONS

U.S. Appl. No. 13/825,728, filed Mar. 22, 2013, US2013/0303042 A1, Schmidt, et al.
U.S. Appl. No. 13/824,084, filed May 20, 2013, US2013/0231022 A1, Schmidt, et al.
U.S. Appl. No. 13/824,035, filed May 22, 2013, US2013/0230716 A1, Schmidt, et al.
U.S. Appl. No. 13/824,064, filed May 9, 2013, US2013/0231017 A1, Schmidt, et al.
U.S. Appl. No. 14/007,585, filed Dec. 5, 2013, US2014/0087613 A1, Spyrou, et al.
U.S. Appl. No. 14/685,162, filed Apr. 13, 2015, Spyrou, et al.
U.S. Appl. No. 14/705,485, filed May 6, 2015, Stapperfenne, et al.
U.S. Appl. No. 14/705,563, filed May 6, 2015, Stapperfenne, et al.
Combined Chinese Office Action and Search Report dated Nov. 4, 2016 in Patent Application No. 201480013875.3 (with English translation).
Japanese Office Action dated Dec. 7, 2017 in corr. Japanese Patent Application No. 2015-562009, filed Feb. 26, 2014 (w/ English translation).

* cited by examiner

COMPOSITE SEMIFINISHED PRODUCTS AND MOULDINGS PRODUCED THEREFROM AND DIRECTLY PRODUCED MOULDINGS BASED ON HYDROXY-FUNCTIONALIZED (METH)ACRYLATES AND URETDIONES WHICH ARE CROSSLINKED BY MEANS OF RADIATION TO GIVE THERMOSETS

FIELD OF THE INVENTION

The invention relates to a process for producing storage-stable polyurethane prepregs and to mouldings (composite components) produced therefrom. The prepregs and, respectively, components are produced by mixing (meth)acrylate monomers, (meth)acrylate polymers, hydroxy-functionalised (meth)acrylate monomers and/or hydroxy-functionalised (meth)acrylate polymers with uretdione materials. Photoinitiators can also optionally be added. This mixture or solution is applied by known processes to fibre material, e.g. carbon fibres, glass fibres or polymer fibres, and is polymerised with the aid of radiation or of plasma methods.

Polymerisation, e.g. at room temperature or at up to 80° C., gives thermoplastics or thermoplastic prepregs, and these can subsequently also be subjected to forming processes. The hydroxy-functionalised (meth)acrylate constituents can then be crosslinked with the uretdiones already present within the system, by use of elevated temperature. It is thus possible to produce dimensionally stable thermosets or dimensionally stable crosslinked composite components.

Fibre-reinforced materials in the form of prepregs are already used in many industrial applications because they are convenient to handle and provide increased efficiency in processing, in comparison with the alternative wet-lay-up technology.

Industrial users of these systems are demanding not only faster cycle times and greater stability in storage—including at room temperature—but also the possibility of cutting the prepregs to size, where automated cutting-to-size and lay-up of the individual prepreg layers is achieved without any contamination of the cutting tools by the matrix material, which is often tacky.

Various shaping processes, e.g. the reaction transfer moulding (RTM) process, include the introduction of the reinforcing fibres into a mould, the closing of the mould, the introduction of the crosslinkable resin formulation into the mould and the subsequent crosslinking of the resin, typically through supply of heat.

One of the restrictions on that type of process is that it is relatively difficult to insert the reinforcing fibres into the mould. The individual layers of the woven fabric or laid scrim must be cut to size and adapted to be appropriate to the different geometries of the mould. That can be both time-consuming and complicated, in particular if the mouldings are also to comprise foam cores or other cores. Preformable fibre reinforcement systems would be desirable here, with simple handling and existing methods for forming processes.

PRIOR ART

The field of crosslinking matrix systems covers not only polyesters, vinyl esters and epoxy systems but also a number of specialised resins. Among the materials used are polyurethane resins which are in particular used for producing composite profiles by way of pultrusion processes, because they are tough and strong, and tolerate damage. A disadvantage frequently mentioned is the toxicity of the isocyanates used. However, the toxicity of epoxy systems and of the hardener components used therein must also be considered as critical. This applies in particular to known sensitivities and allergies.

Prepregs and composites produced therefrom, based on epoxy systems, are described by way of example in WO 98/50211, EP 309 221, EP 297 674, WO 89/04335 and U.S. Pat. No. 4,377,657. WO 2006/043019 describes a process for producing prepregs based on epoxy-resin-polyurethane powders. Prepregs based on pulverulent thermoplastics have also been disclosed as matrix.

WO 99/64216 describes prepregs and composites, and also a method for producing these, by using emulsions with polymer particles so small as to permit sheathing of individual fibres. The viscosity of the polymers of the particles is at least 5000 centipoise, and the polymers are either thermoplastics or crosslinking polyurethane polymers.

EP 0590702 describes powder-impregnation systems for producing prepregs where the powder is composed of a mixture of a thermoplastic and of a reactive monomer and, respectively, prepolymers. WO 2005/091715 likewise describes the use of thermoplastics for producing prepregs.

Prepregs with a matrix based on 2-component polyurethanes (2-C PUs) are likewise known. The 2-C PU category comprises in essence the traditional reactive polyurethane-resin systems. In principle, the system involved here is made of two separate components. Whereas the main constituent of one of the components is always a polyisocyanate, e.g. polymeric methylenediphenyl diisocyanates (MDIs), the main constituent of the second component is polyols or in more recent developments amino- or amine-polyol mixtures. The two parts are mixed with one another only shortly prior to use. Chemical hardening then takes place through polyaddition with formation of a network made of polyurethane or polyurea. Once the two constituents of 2-component systems have been mixed, the systems have a restricted usage time (operating time, pot life), since the reaction that begins leads to gradual viscosity increase and finally to gelling of the system. There are numerous variables here determining the effective usage time: reactivity of the reactants, catalysis, concentration, solubility, moisture content, NCO/OH ratio and ambient temperature being the most important [in which connection see: Lackharze [Coating resins], Stoye/Freitag, Hauser-Verlag 1996, pp. 210/212]. The disadvantage of prepregs based on 2-C PU systems of this type is that only a short time is available for the use of the prepreg to give a composite. The storage stability of prepregs of this type does not therefore exceed a number of hours, and certainly does not extend to days.

Apart from the different binder on which they are based, moisture-curing coatings correspond substantially to analogous 2C systems not only in terms of their composition but also in terms of their properties. In principle, the same solvents, pigments, fillers and auxiliaries are used. These systems differ from 2C coatings in that, for reasons of stability, they do not tolerate any moisture at all prior to their application.

DE 102009001793.3 and DE 102009001806.9 describe a process for producing storage-stable prepregs in essence composed of A) at least one fibrous substrate and B) at least one reactive pulverulent polyurethane composition as matrix material.

Those systems can also comprise poly(meth)acrylates as co-binders or polyol component. DE 102010029355.5 uses a direct melt impregnation process to introduce compositions of this type into the fibre material. DE 102010030234.1 uses pretreatment with solvents. These systems have the disadvantage of high melt viscosity or the use of solvents which at some stage have to be removed, or which can also have attendant toxicological disadvantages.

OBJECT

In the light of the prior art, the object of the present invention was to provide novel prepreg technology from which a simpler process can be obtained for producing prepreg systems that are easy to handle.

A particular object of the present invention was to provide an accelerated process for producing prepregs which, in comparison with the prior art, can give markedly prolonged storage stability and/or pot life. A further intention is that weight loss, in particular in the form of evaporation of the reactive diluent, be kept below 20%, based on the matrix.

ACHIEVEMENT OF OBJECTS

The objects are achieved by means of a novel process for producing composite semifinished products and further processing of these to give mouldings. This novel process comprises the following steps:

I. producing a reactive composition comprising a composition, where said composition comprises at least A) a reactive resin component based on (meth)acrylate, where at least one constituent of the resin component has hydroxy groups, amine groups and/or thiol groups, B) as isocyanate component, at least one di- or polyisocyanate blocked with blocking agents and/or internally blocked and C) optionally at least one photoinitiator. Step I can by way of example be achieved through simple stirring of the three components together.

II. directly impregnating a fibrous substrate with the composition from I,

III. hardening the resin component in the composition by means of electromagnetic radiation, electron beam, or a plasma, IV. shaping to give the subsequent moulding and V. hardening the isocyanate component in the composition.

It is preferable here that the quantitative ratio of the resin component to the isocyanate component is from 90:10 to 50:50. It is very particularly preferable that the ratio in which the resin component and the isocyanate component are present in relation to one another is such that for each hydroxy group of the resin component 1 the number of uretdione groups is from 0.3 to 1.0, preferably from 0.4 to 0.9, particularly preferably from 0.45 to 0.55, where this corresponds to from 0.6 to 2.0, preferably from 0.8 to 1.8 and particularly preferably from 0.9 to 1.1, externally blocked isocyanate groups of the isocyanate component.

The resin component is in particular at least composed of from 0 to 30% by weight, preferably from 1 to 15% by weight and particularly preferably from 2 to 10% by weight, of crosslinking agents, from 30 to 100% by weight, preferably from 40 to 80% by weight and particularly preferably from 40 to 60% by weight, of monomers, from 0 to 40% by weight, preferably from 5 to 30% by weight, of one or more prepolymers and from 0 to 10% by weight, preferably from 0.5 to 8% by weight and particularly preferably from 3 to 6% by weight, of photoinitiators. It is preferable that the photoinitiator involves hydroxyketones and/or bisacylphosphines.

The advantage of this system of the invention consists in the production of a deformable thermoplastic semifinished product/prepreg which is crosslinked in a further step to a give a thermoset during the production of the composite components. The starting formulation is liquid and is therefore suitable for impregnation of fibre material without addition of solvents. The semifinished products are storage-stable at room temperature. The resultant mouldings have higher heat resistance than other polyurethane systems. In comparison with familiar epoxy systems, they feature higher flexibility. Matrices of this type can moreover be designed to be light-resistant, and can therefore be used for producing carbon-faced components without further coating.

Surprisingly, it has been found possible to produce adequately impregnated, reactive storage-stable composite semifinished products by using the abovementioned combination of a reactive (meth)acrylate resin and an isocyanate component.

The resultant composite semifinished products have processing properties which are at least the same as, or else even better than, those of the prior art, and can be used to produce high-performance composites for a very wide variety of applications for the construction industry, automobile industry, aerospace industry, and power engineering (wind turbines) and for boatbuilding and shipbuilding. The reactive compositions that can be used according to the invention are environmentally friendly and inexpensive, and have good mechanical properties, are easy to process and, after curing, have good weathering resistance, for example have a balanced ratio of hardness to flexibility.

For the purposes of this invention, the expression composite semifinished products is used synonymously with the expressions prepreg and organopanel. A prepreg is generally a precursor for thermoset composite components. An organopanel is normally a corresponding precursor for thermoplastic composite components.

In one particular embodiment, the resin component also comprises urethane (meth)acrylates. In this type of embodiment, the composition of the resin component derives from processes according to at least one of claims 1 and 2, characterized in that the resin component is at least composed of from 0 to 30% by weight, preferably from 1 to 15% by weight and particularly preferably from 2 to 10% by weight, of crosslinking agents, from 30 to 99% by weight, preferably from 40 to 80% by weight and particularly preferably from 40 to 60% by weight, of monomers, from 0 to 40% by weight, preferably from 5 to 30% by weight, of one or more prepolymers, from 1 to 20% by weight, preferably from 2 to 10% by weight and particularly preferably from 4 to 8% by weight, of urethane (meth)acrylates and from 0 to 10% by weight, preferably from 0.5 to 8% by weight, and particularly preferably from 3 to 6% by weight, of photoinitiators.

The photoinitiators preferably used can in particular involve hydroxyketones and/or bisacylphosphines, or else mixtures of these. If the photoinitiators are added, the concentration present of these in the composition is from 0.2 to 10.0% by weight, preferably from 0.5 to 3% by weight and particularly preferably from 3 to 6% by weight.

Substrate

The substrate material preferably used in the process of the invention in the composite semifinished product is characterized in that the fibrous substrates are composed mostly of glass, carbon, plastics, such as polyamide (aramid) or polyester, natural fibres, or mineral fibre materials, such as basalt fibres or ceramic fibres. The fibrous substrates take the form of textile sheets made of non-woven, knitted fabrics, non-knitted structures such as woven fabrics, laid scrims or braided fabrics, in the form of long-fibre materials or of short-fibre materials.

A detailed embodiment is as follows: the fibrous substrate in the present invention is composed of fibrous material (often also termed reinforcing fibres). Any material of which the fibres are composed is generally suitable, but it is preferable to use fibrous material made of glass, of carbon, of plastics, e.g. polyamide (aramid) or polyester, of natural fibres or of mineral fibre materials such as basalt fibres or ceramic fibres (oxidic fibres based on aluminium oxides and/or silicon oxides). It is also possible to use mixtures of fibre types, e.g. woven-fabric combinations made of aramid fibres and of glass fibres, or carbon fibres and glass fibres. Hybrid composite components can also be produced with prepregs made of various fibrous substrates. Glass fibres are the most frequently used types of fibre, predominantly because they are relatively inexpensive. In principle, all types of glass-based reinforcing fibres are suitable here (fibres made of E glass, of S glass, of R glass, of M glass, of C glass, of ECR glass, of D glass, or of AR glass, or hollow glass fibres). Carbon fibres are generally used in high-performance composite materials, where another important factor is that the density is lower than that of glass fibre while strength is high. Carbon fibres are industrially produced fibres made of carbon-containing starting materials, which are converted through pyrolysis into carbon arranged in graphite-like form. A distinction is made between isotropic and anisotropic types: isotropic fibres have only low strengths and are of less industrial importance; anisotropic fibres exhibit high strengths and stiffnesses together with low tensile strain at break. The expression natural fibres here means any textile fibres and fibre materials which are obtained from vegetable or animal material (e.g. fibres made of wood, of cellulose, of cotton, of hemp, of jute, of linen, of sisal, or of bamboo). Aramid fibres have a negative coefficient of thermal expansion, i.e. become shorter on heating, and this is also true of carbon fibres. The specific strength of aramid fibres, and their modulus of elasticity, are markedly lower than those of carbon fibres. Combination with the positive coefficient of expansion of the matrix resin can lead to manufacture of components with high dimensional stability. The compressive strength of aramid-fibre composite materials is markedly less than that of carbon-fibre-reinforced plastics. Known trademarks for aramid fibres are Nomex® and Kevlar® from DuPont, or Teijinconex®, Twaron® and Technora® from Teijin. Particularly suitable and preferred are substrates made of glass fibres, carbon fibres, aramid fibres or ceramic fibres. The fibrous material comprises a textile sheet. Suitable materials are textile sheets made of non-woven; knitted fabrics are equally suitable, as also are non-knitted structures such as woven fabrics, laid scrims or braided fabrics. A distinction is also made between long-fibre materials and short-fibre materials as substrates. Rovings and yarns are equally suitable according to the invention. All of the materials mentioned are suitable as fibrous substrates for the purposes of the invention. An overview of reinforcing fibres is found in "Composites Technologien" [Technologies of composites], Paolo Ermanni (Version 4), lecture script, ETH Zürich, August 2007, Chapter 7.

Isocyanate Component

Isocyanate component used comprises, as first embodiment, di- and polyisocyanates blocked with blocking agents or comprises, as second embodiment, internally blocked di- and polyisocyanates. The internally blocked isocyanates involve what are known as uretdiones. The di- and polyisocyanates used according to the invention can be composed of any desired aromatic, aliphatic, cycloaliphatic and/or (cyclo)aliphatic di- and/or polyisocyanates. German Patent Application DE 102010030234.1 gives a list of possible di- and polyisocyanates, and also reagents for external blocking thereof.

In a first embodiment, the polyisocyanates used according to the invention have been externally blocked. External blocking agents can be used for this purpose, and examples can be found in DE 102010030234.1. The di- or polyisocyanates used in this embodiment are preferably hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI) and/or norbornane diisocyanate (NBDI), and it is also possible to use the isocyanurates here. Preferred blocking agents are selected from ethyl acetoacetate, diisopropylamine, methyl ethyl ketoxime, diethyl malonate, ε-caprolactam, 1,2,4-triazole, phenol or substituted phenols and/or 3,5-dimethylpyrazole. The hardener components particularly preferably used are isophorone diisocyanate (IPDI) adducts, where these comprise isocyanurate moieties and ε-caprolactam-blocked isocyanate structures.

The isocyanate component can also comprise from 0.01 to 5.0% by weight of catalysts. Catalysts used preferably comprise organometallic compounds, such as dibutyltin dilaurate, zinc octanoate or bismuth neodecanoate, and/or tertiary amines, particularly preferably 1,4-diazabicyclo[2.2.2]octane. Tertiary amines are in particular used in concentrations of from 0.001 to 1% by weight. These reactive polyurethane compositions used according to the invention can by way of example be hardened under normal conditions, e.g. with DBTL catalysis, at temperatures starting at 160° C., usually starting at about 180° C.

In a second, preferred embodiment, the isocyanate components are present with internal blocking. The internal blocking is achieved by way of dimer formation by way of uretdione structures which at elevated temperature in turn cleave to restore the isocyanate structures initially present and thus initiate the crosslinking with the binder.

Polyisocyanates comprising uretdione groups are well known and are described by way of example in U.S. Pat. No. 4,476,054, U.S. Pat. No. 4,912,210, U.S. Pat. No. 4,929,724 and EP 417 603. A comprehensive overview of industrially relevant processes for dimerizing isocyanates to give uretdiones is given in J. Prakt. Chem. 336 (1994) 185-200. The reaction of isocyanates to give uretdiones generally takes place in the presence of soluble dimerization catalysts, e.g. dialkylaminopyridines, trialkylphosphines, phosphorous triamides or imidazoles. The rection—carried out optionally in solvents but preferably in the absence of solvents—is terminated by addition of catalyst poisons on reaching a desired conversion. Excess monomeric isocyanate is then removed by molecular evaporation. If the catalyst is sufficiently volatile, the reaction mixture can be freed from the catalyst during the course of monomer removal. In this case it is possible to omit the addition of catalyst poisons. In principle, there is a wide range of isocyanates suitable for the production of polyisocyanates comprising uretdione groups. The abovementioned di- and polyisocyanates can be used.

Both for the embodiment involving the externally blocked isocyanates and for the embodiment involving the uretdiones, preference is given to di- and polyisocyanates made of any desired aliphatic, cycloaliphatic and/or (cyclo)aliphatic di- and/or polyisocyanates. The following are used according to the invention: isophorone diisocyanate (IPDI), hexamethylene diisocyanate (HDI), diisocyanatodicyclohexylmethane ($H_{12}MDI$), 2-methylpentane diisocyanate (MPDI), 2,2,4-trimethylhexamethylene diisocyanate/2,4,4-trimethylhexamethylene diisocyanate (TMDI) and norbornane diisocyanate (NBDI). It is very particularly preferable to use IPDI, HDI, TMDI and $H_{12}MDI$ and it is also possible here to use the isocyanurates.

It is very particularly preferable to use IPDI and HDI for the matrix material. The reaction of these polyisocyanates comprising uretdione groups to give hardeners a) comprising uretdione groups includes the reaction of the free NCO groups with polymers or monomers comprising hydroxy groups, examples being polyesters, polythioethers, polyethers, polycaprolactams, polyepoxides, polyesteramides, polyurethanes and low-molecular-weight di-, tri- and/or tetraalcohols as chain extenders and optionally monoamines and/or monoalcohols as chain terminators, and has been frequently described (EP 669 353, EP 669 354, DE 30 30 572, EP 639 598 or EP 803 524).

Preferred hardeners a) having uretdione groups have free NCO content less than 5% by weight and from 3 to 25% by weight, preferably from 6 to 18% by weight, content of uretdione groups (calculated as $C_2N_2O_2$, molecular weight 84). Preference is given to polyesters and monomeric dialcohols. The hardeners can also have isocyanurate structures, biuret structures, allophanate structures, urethane structures and/or urea structures, apart from the uretdione groups.

It is preferable that the isocyanate component is solid below 40° C. and liquid above 125° C. The isocyanate component can optionally comprise other known polyurethane-chemistry auxiliaries and other known polyurethane-chemistry additives. With reference to the embodiment comprising uretdione, the isocyanate component has less than 5% by weight free NCO content and from 3 to 25% by weight uretdione content.

The isocyanate composition of this embodiment can moreover comprise from 0.01 to 5% by weight, preferably from 0.3 to 2% by weight, of at least one catalyst selected from quaternary ammonium salts, preferably tetraalkylammonium salts, and/or quaternary phosphonium salts having halogens, hydroxides, alcoholates or organic or inorganic acid anions as counterion, and from 0.1 to 5% by weight, preferably from 0.3 to 2% by weight, of at least one co-catalyst selected from either at least one epoxide and/or at least one metal acetylacetonate and/or quaternary ammonium acetylacetonate and/or quaternary phosphonium acetylacetonate. All of the quantitative data relating to the (co-)catalysts are based on the entire formulation of the matrix material. Examples of metal acetylacetonates are zinc acetylacetonate, lithium acetylacetonate and tin acetylacetonate, alone or in mixtures. It is preferable to use zinc acetylacetonate.

DE 102010030234.1 gives examples of quaternary ammonium acetylacetonates and quaternay phosphonium acetylacetonates. It is particularly preferable to use tetraethylammonium acetylacetonate and tetrabutylammonium acetylacetonate. It is also possible, of course, to use mixtures of catalysts of this type.

DE 102010030234.1 gives examples of the catalysts. These catalysts can be added alone or in mixtures. It is preferable to use tetraethylammonium benzoate and tetrabutylammonium hydroxide.

Examples of epoxide-containing co-catalysts that can be used here are glycidyl ethers and glycidyl esters, aliphatic epoxides, diglycidyl ethers based on bisphenol A and glycidyl methacrylates. Examples of epoxides of this type are triglycidyl isocyanurate (TGIC, trade name ARALDITE 810, Huntsman), mixtures of diglycidyl terephthalate and triglycidyl trimellitate (trade name ARALDITE PT 910 and 912, Huntsman), glycidyl esters of Versatic acid (trade name KARDURA E10, Shell), 3,4-epoxycyclohexylmethyl 3',4'-epoxycyclohexane carboxylate (ECC), diglycidyl ethers based on bisphenol A (trade name EPIKOTE 828, Shell), ethylhexyl glycidyl ether, butyl glycidyl ether, pentaerythritol tetraglycidyl ether, (trade name POLYPDX R 16, UPPC AG), and also other Polypox grades having free epoxy groups. It is also possible to use mixtures. It is preferable to use ARALDITE PT 910 and 912.

Not only the rate of the crosslinking reaction during the production of the composite components, but also the properties of the matrix can be varied widely, depending on the composition of the (highly) reactive isocyanate component used and any catalysts added.

Resin Components

Resin components used according to the invention comprise reactive resins based on methacrylate. The resin component used according to the invention in particular has the following composition:

from 30 to 100% by weight, preferably from 40 to 80% by weight and particularly preferably from 40 to 60% by weight, of monomers, preferably (meth)acrylates and/or components copolymerisable with (meth)acrylates, from 0 to 40% by weight, preferably from 5 to 30% by weight, of one or more prepolymers, from 0 to 30% by weight, preferably from 1 to 15% by weight and particularly preferably from 2 to 10% by weight, of crosslinking agents, preferably selected from the group of the oligo- or di(meth)acrylates, from 0 to 10% by weight, preferably from 0.5 to 8% by weight and particularly preferably from 3 to 6% by weight, of photoinitiators, preferably hydroxyketones and/or bisacylphosphines.

The expression (meth)acrylates here comprises methacrylates and acrylates, and also mixtures of methacrylates and acrylates.

Other components can optionally also be present. The following can also be used as auxiliaries and additives: chain-transfer agents, plasticizers, stabilizers and/or inhibitors. The following can moreover be added: dyes, fillers, wetting agents, dispersing agents and levelling agents, adhesion promoters, UV stabilizers, antifoams and rheology additives. In particular, the resin component can comprise the following additional constituents:

from 1 to 20% by weight of urethane (meth)acrylates.

A decisive factor for the present invention is that the monomers and/or prepolymers from the resin component have functional groups. Suitable functional groups of this type are hydroxy groups, amino groups and/or thiol groups, where these undergo an additional reaction with the free isocyanate groups and, respectively, uretdione groups from the isocyanate component, and thus additionally provide crosslinking and hardening. The OH number of the resin component here is from 10 to 1000 mg KOH/gram, preferably from 20 to 500 mg KOH/gram, particularly preferably from 20 to 150 mg KOH/gram.

The amount of the functional groups is in particular selected in such a way that, for each functional group of the resin components, the number of isocyanate equivalents is from 0.6 to 2.0 or the number of uretdione groups of the isocyanate component is from 0.3 to 1.0, preferably from 0.4 to 0.8 and particularly preferably from 0.45 to 0.55. This corresponds to from 0.6 to 2.0 externally blocked isocyanate groups of the isocyanate component, preferably from 0.8 to 1.6 and particularly preferably from 0.9 to 1.1.

Photoinitiators and production thereof are described by way of example in "Radiation Curing in Polymer Science & Technology, Vol II: Photoinitiating Systems" by J. P. Fouassier, J. F. Rabek, Elsevier Applied Science, London and New York, 1993. These often involve a-hydroxyketones or derivatives of these or phosphines. If the photoinitiators are present, the amounts of these present can be from 0.2 to 10% by weight. Examples of photoinitiators that can be used are the following products available in the market: CGI 725 (BASF), Chivacure 300 (Chitec), Irgacure PAG 121 (BASF), Irgacure PAG 103 (BASF), Chivacure 534 (Chitec), H-Nu 470 (Spectra Group Limited), TPO (BASF), Irgacure 651 (BASF), Irgacure 819 (BASF), Irgacure 500 (BASF), Irgacure 127 (BASF), Irgacure 184 (BASF), Duracure 1173 (BASF).

The monomers present in the reactive resin involve compounds selected from the group of the (meth)acrylates, for example alkyl (meth)acrylates of straight-chain, branched or cycloaliphatic alcohols having from 1 to 40 carbon atoms, e.g. methyl (meth)acrylate, ethyl (meth)acrylate, n-butyl (meth)acrylate or 2-ethylhexyl (meth)acrylate.

Other suitable constituents of monomer mixtures are additional monomers having a further functional group, for example α,β-unsaturated mono- or dicarboxylic acids, such as acrylic acid, methacrylic acid or itaconic acid; esters of acrylic acid or methacrylic acid with dihydric alcohols, for example hydroxyethyl (meth)acrylate or hydroxypropyl (meth)acrylate; acrylamide or methacrylamide; or dimethylaminoethyl (meth)acrylate. Examples of other suitable constituents of monomer mixtures are glycidyl (meth)acrylate and silyl-functional (meth)acrylates.

The monomer mixtures can also comprise, alongside the (meth)acrylates described above, other unsaturated monomers which are copolymerisable with the abovementioned (meth)acrylates by means of free-radical polymerization. Among these are, inter alia, 1-alkenes or styrenes.

The crosslinking agents are an optional constituent of the reactive resin of the invention. These are in particular polyfunctional methacrylates, such as allyl (meth)acrylate. Particular preference is given to di- or tri(meth)acrylates, such as 1,4-butanediol di(meth)acrylate, tetraethylene glycol di(meth)acrylate, triethylene glycol di(meth)acrylate or trimethylolpropane tri(meth)acrylate.

The detailed composition of the monomers will advantageously be selected, in terms of content and constitution, with a view to the desired technical function and the substrate material that is to be wetted.

The resin component can also comprise, alongside the monomers listed, polymers which, in order that they can be distinguished more clearly from other materials for the purposes of this Patent, are termed prepolymer, preference being given to polyesters or poly(meth)acrylates. These are used to improve polymerization properties, mechanical properties, adhesion to the substrate material, viscosity adjustment during processing or wetting of the substrate material with the resin, and also the optical properties of the resins. The prepolymer content of the reactive resin here is from 0% by weight to 50% by weight, preferably from 15% by weight to 40% by weight. The polyesters, and also the poly(meth)acrylates, can have additional functional groups in order to promote adhesion or for the copolymerisation in the crosslinking reaction, for example in the form of double bonds. It is preferable that the prepolymers have hydroxy groups, amine groups or thiol groups.

Said poly(meth)acrylates are generally composed of the monomers already listed in relation to the monomers within the resin system. They can be obtained by solution polymerization, emulsion polymerization, suspension polymerization, bulk polymerization or precipitation polymerization, and are added in the form of pure material to the system.

Said polyesters are obtained in bulk via polycondensation or ring-opening polymerization, and are composed of the units known for these applications.

Chain-transfer agents used can comprise any of the compounds known from free-radical polymerisation. It is preferable to use mercaptans, such as n-dodecyl mercaptan.

Conventional UV stabilizers can equally be used. It is preferable that the UV stabilizers are selected from the group of the benzophenone derivatives, benzotriazole derivatives, thioxanthonate derivates, piperidinolcarboxylic ester derivatives or cinnamic ester derivatives. From the group of the stabilizers and inhibitors it is preferable to use substituted phenols, hydroquinone derivatives, phosphines and phosphites.

Preferred rheology additives used are polyhydroxycarboxamides, urea derivatives, salts of unsaturated carboxylic esters, alkylammonium salts of acidic phosphoric acid derivatives, ketoximes, amine salts of p-toluenesulphonic acid, amine salts of sulphonic acid derivatives, and also aqueous or organic solutions or mixtures of the compounds. Rheology additives based on fumed or precipitated, optionally also silanized, silicas with BET surface area of from 10 to 700 $nm^2/g$ have been found to be particularly suitable.

Antifoams are preferably selected from the group of the alcohols, hydrocarbons, paraffin-based mineral oils, glycol derivatives, derivatives of glycolic esters, derivatives of acetic esters and derivatives of polysiloxanes.

Hardening in Step III

UV-curing and UV lamps are described by way of example in "Radiation Curing in Polymer Science & Technology, Vol I: Fundamentals and Methods" by J. P. Fouassier, J. F. Rabek, Elsevier Applied Science, London and New York, 1993, Chapter 8, pp. 453 to 503. Preference is given to UV lamps which emit little to no radiated heat, e.g. UV LED lamps.

Electron-beam curing and electron-beam hardeners are described by way of example in "Radiation Curing in Polymer Science & Technology, Vol I: Fundamentals and Methods" by J. P. Fouassier, J. F. Rabek, Elsevier Applied Science, London and New York, 1993, Chapter 4, pp. 193 to 225, and Chapter 9, pp. 503 to 555. If electron beams are used to initiate a polymerisation, it is then unnecessary to use photoinitiators.

The same applies to plasma applications. Plasmas are often used in vacuo. Plasma polymerisation of MMA is described by way of example in the work carried out by C. W. Paul, A. T. Bell and D. S. Soong "Initiation of Methyl Methacrylate Polymerization by the Nonvolatile Products of a Methyl Methacrylate Plasma. 1. Polymerization Kinetics" (Macromolecules 1985, Vol. 18, 11, 2312-2321). A vacuum plasma of the type described is used here.

According to the invention the present process uses, as free-radical source, what is known as an atmospheric-pressure plasma. By way of example, use may be made for this purpose of commercially available plasma jets/plasma beams as supplied by way of example by Plasmatreat GmbH or Diener GmbH. The plasma operates under atmospheric pressure and is used inter alia in the automobile industry for removing greases or other contaminants of surfaces. A difference from the plasma process described in the literature is that according to the invention the plasma is generated outside of the actual reaction zone (polymerisation) and is blown with high flow velocity onto the surface of the applied reactive-resin or cold-plastic coating that is to be treated, on the floor area. This gives a sort of "plasma flare". The process has the advantage that the actual formation of the plasma is not influenced by the substrate, and this leads to low levels of process risk. The plasma jets are normally operated with air, producing an oxygen/nitrogen plasma. The plasma in the plasma jets is generated by electrical discharge in the interior of the nozzle. The electrodes are electrically isolated. A high voltage is thus applied, until sparking occurs between the electrodes. Discharge is achieved. It is possible here to vary the number of discharges per unit of time. The discharges can result from pulses of direct voltage. Another possibility is to achieve the discharges by using an alternating voltage.

Once the prepregs have been produced on the fibre with the aid of radiation or plasmas in step III, this product can be stacked and converted to a desired form: the final crosslinking then takes place with the aid of heat. Temperatures and times for this crosslinking are from 80 to 220° C. and from 72 h to 5 sec, depending on usage and amount of catalysts. Preference is given to temperatures of from 140 to 200° C. and to hardening times of from 30 min to 3 min. It is preferable to apply an exterior pressure during crosslinking.

The polymer compositions used according to the invention provide very good flow at low viscosity and therefore good impregnation capability, and excellent chemicals resistance in the hardened state. Use of aliphatic crosslinking agents, such as IPDI or $H_{12}$MDI, and the use according to the invention of the functionalised poly(meth)acrylates also achieves good weathering resistance.

The composite semifinished products produced according to the invention are moreover very storage-stable under room-temperature conditions, generally for a plurality of weeks and even months. They can therefore be further processed at any time to give composite components. This is the essential difference from the systems according to the prior art which are reactive and not storage-stable, since after application these immediately begin to react, for example to give polyurethanes, and thus to crosslink.

The storage-stable composite semifinished products can then be further processed at a subsequent juncture to give composite components. Use of the composite semifinished products of the invention achieves very good impregnation of the fibrous substrate, because the liquid resin components comprising the isocyanate component wet the fibres of the substrate very effectively, while the thermal stress which is imposed on the polymer composition by prior homogenisation of the polymer composition and which can lead to onset of a second crosslinking reaction is avoided, and moreover the steps of grinding and sieving to give individual particle-size fractions are omitted, and it is thus possible to achieve a higher yield of impregnated fibrous substrate.

Another major advantage of the composite semifinished products produced according to the invention is that the high temperatures needed, at least briefly, in the melt impregnation process or in the incipient sintering of pulverulent reactive polyurethane compositions are not an essential requirement in this process of the invention.

PARTICULAR ASPECTS OF THE PROCESS OF THE INVENTION

Step II, the impregnation, is achieved through saturation of the fibres, woven fabric or laid scrim with the formulation produced in step I. The impregnation is preferably achieved at room temperature.

Step III, the hardening of the resin component, takes place directly after step II. The hardening is achieved through irradiation with electromagnetic radiation, preferably UV radiation, with electron beams or through application of a plasma field. It is necessary to ensure here that the temperature is below the hardening temperature needed for step V.

After step III or IV, the composite semifinished products/prepregs produced according to the invention have very high storage stability at room temperature. This depends on the reactive polyurethane composition present, being at least some days at room temperature. The composite semifinished products are generally storage-stable for a plurality of weeks at 40° C. or below, and also for a plurality of years at room temperature. The resultant prepregs are non-tacky and are therefore very amenable to handling and to further processing. The (highly) reactive polyurethane compositions used according to the invention accordingly exhibit very good adhesion and distribution on the fibrous substrate.

In step IV, the resultant composite semifinished products/prepregs can, if necessary, be combined and cut to size to give various shapes. In particular, they can be cut to size, and optionally sewn or fixed by other means, in order to consolidate a number of composite semifinished products to give a single composite, prior to final crosslinking of the matrix material to give the matrix.

In step V, the final hardening of the composite semifinished products takes place to give mouldings crosslinked to give thermosets. This is achieved through thermal hardening involving the hydroxy groups of resin component 1 with the isocyanate component.

For the purposes of this invention, this procedure of production of the composite components from the prepregs takes place at temperatures which, depending on hardening time, are above about 160° C. when reactive matrix materials are used (variant I), or at temperatures above 100° C. when highly reactive matrix materials provided with appropriate catalysts are used (variant II). In particular, the material is hardened at a temperature of from 80 to 200° C., particularly preferably at a temperature of from 120 to 180° C.

During the hardening in step V, the composite semifinished products can also be pressed in a suitable mould under pressure and optionally with application of vacuum.

The reactive polyurethane compositions used according to the invention are hardened under normal conditions, e.g. with DBTL catalysis, at temperatures starting from 160° C., usually starting from about 180° C. The reactive polyurethane compositions used according to the invention provide very good flow and therefore good impregnation capability, and in the hardened state they exhibit excellent chemicals resistance. When aliphatic crosslinking agents are used (e.g. IPDI or H12MDI), good weathering resistance is also achieved.

When the invention uses the isocyanate component which is highly reactive and therefore cures at low temperature, the hardening temperature of from 80 to 160° C. not only permits saving of energy and hardening time but also permits use of many heat-sensitive substrates.

The polyurethane compositions of the second embodiment, containing uretdione groups, are hardened in step V at temperatures of from 80 to 160° C., and specifically in accordance with the nature of the substrate. This hardening temperature is preferably from 120 to 180° C., particularly preferably from 120 to 150° C., and it is particularly preferable that the temperature for hardening is in the range from 130 to 140° C. The time for the hardening of the polyurethane composition used according to the invention is within from 5 to 60 minutes.

However, it is also possible to use specific catalysts to accelerate the reaction for the second hardening in step V, examples being quaternary ammonium salts, preferably carboxylates or hydroxides, particularly preferably in combination with epoxides; metal acetylacetonates can also be used, preferably in combination with quaternary ammonium halides. These catalyst systems ensure that the curing temperature for the second hardening is reduced as far as 100° C., or else that shorter curing times are needed at higher temperatures.

Other Constituents of the Prepregs

The composite semifinished products can also comprise other additives in addition to the resin component, the substrate material and the isocyanate component: by way of example it is possible to add light stabilizers, e.g. sterically hindered amines, or other auxiliaries as described by way of example in EP 669 353, the total amount thereof being from 0.05 to 5% by weight. An amount of up to 30% by weight, based on the total composition, of fillers and pigments can be added, an example being titanium dioxide. It is moreover possible to add additives such as levelling agents, e.g. polysilicones, or adhesion promoters, e.g. those based on acrylate, in the production of the reactive polyurethane compositions of the invention.

The invention also provides the use of the prepregs, in particular with fibrous substrates made of glass fibres, of carbon fibres or of aramid fibres. In particular, the invention also provides the use of the prepregs produced according to the invention for producing composites in boat construction and shipbuilding, in aerospace, in automobile construction, for bicycles, preferably motorcycles and pedal cycles, in the automotive, construction, medical technology, sports, and electrical and electronics industry sectors, or in power-generating systems, for example for wind-turbine rotor blades.

The invention also provides the mouldings or composite components which have been produced from the composite semifinished products or prepregs produced according to the invention and which are composed of at least one fibrous substrate and of at least one crosslinked reactive composition, preferably one crosslinked reactive composition containing uretdione groups, containing a (meth)acrylate resin as matrix.

EXAMPLES

The examples use the following glass-fibre laid scrims/woven glass-fibre fabrics: woven glass-filament fabric, 296 g/m² —Atlas, finish FK 144 (Interglas 92626)

Production of uretdione-containing hardener H:

119.1 g of IPDI uretdione (Evonik Degussa GmbH) were dissolved in 100 ml of methyl methacrylate, and 27.5 g of methylpentanediol and 3.5 g of trimethylolpropane were admixed therewith. After addition of 0.01 g of dibutyltin dilaurate, the mixture was heated to 80° C. for 4 h, with stirring. There were then no remaining NCO groups detectable titrimetrically. The effective latent NCO content of the hardener H is 12.8% by weight (based on solids).

Reactive Polyurethane Composition

Reactive polyurethane compositions with the following formulations were used for producing the prepregs and the composites.

Comparative Example 1 corresponds to the teaching of WO 2011/071450.

| Comparative Example 1 | | | |
|---|---|---|---|
| Hardener H (60% in MMA) (effective NCO: 7.7%) | Hardener component a) containing uretdione groups | 53.3% by wt. | Evonik Industries AG |
| Hydroxypropyl acrylate | Reactive diluent containing OH | 14.0% by wt | Evonik Industries AG |
| Lamination resin C | Methacrylate resin | 8.2% by wt | Evonik Industries AG |
| Methyl methacrylate (MMA) | Reactive diluent | 22.7% by wt | Evonik Industries AG |
| Dibenzoyl peroxide | Free-radical initiator | 0.9% by wt | Fluka |
| N,N-bis(2-hydroxyethyl)-p-toluidine | Accelerator | 0.9% by wt | Aldrich |

The starting materials from the table were intimately mixed in a premixer and then dissolved. This mixture can be used for about 2-3 h before it gels.

To produce the prepregs, the woven glass-fibre fabric was saturated with the solution of the matrix materials. The prepregs were dried to constant weight for 30 min in an oven at temperatures of 60° C. Fibre content by mass was determined as 47% in Example 1.

The prepreg of Example 1 exhibited a weight loss after drying of about 34%, based on matrix. The impregnated glass-fibre mats were pressed at 180° C. and 50 bar for 1 h (Polystat 200 T from Schwabenthan) and thus fully crosslinked. The Tg of the hard, stiff, chemicals-resistant and impact-resistant composite components (sheet material) was 119° C.

| Example 1 (according to the invention) | | | |
|---|---|---|---|
| Hardener H (60% in MMA) (effective NCO: 7.7%) | Hardener component a) containing uretdione groups | 53.3 wt % | Evonik Industries AG |
| Hydroxypropyl acrylate | Reactive diluent containing OH | 14.0 wt % | Evonik Industries AG |
| Lamination resin C | Methacrylate resin | 8.2 wt % | Evonik Industries AG |
| Methyl methacrylate | Reactive diluent | 22.7 wt % | Evonik Industries AG |
| Irgacure 819 | Photoinitiator | 1.8 wt % | Ciba |

The starting materials from the table were intimately mixed in a premixer and then dissolved. If light is excluded, this mixture can be stored for about 1-2 years without gelling.

To produce the prepreg, the woven glass-fibre fabric was saturated with the solution of the matrix materials. The material was then dried at 1.5 m/min under a UV LED lamp (Heraeus NobleCure®, based on water-cooled heat sink, wavelength: 395±5 nm, power density: 8 W/cm² at operating distance of 5 mm, emission window: 251×35 mm²). Fibre content by mass was determined as 54% in Example 2.

The prepreg of Example 2 exhibited a weight loss after drying of about 12%, based on matrix.

The impregnated glass-fibre mats were pressed at 180° C. and 50 bar for 1 h (Polystat 200 T from Schwabenthan). The Tg of the hard, stiff, chemicals-resistant and impact-resistant composite components (sheet material) was 123° C.

It was thus possible to show that the process of the invention can significantly reduce the loss of reactive diluent.

The invention claimed is:

1. A process for producing a composite moulding, comprising:
    i) preparing a reactive composition comprising:
        a (meth)acrylate monomer having one group selected from the group consisting of a hydroxyl group, an amine group and a thiol group;
        a reactive resin component based on (meth)acrylate wherein at least one constituent of the resin component has hydroxy groups, amine groups and/or thiol groups,
        a blocked di- or poly-isocyanate,
        wherein the di- or poly-isocyanate is blocked with a blocking agent or is internally blocked, and
        at least one photoinitiator;
    ii) directly impregnating a fibrous substrate with the reactive composition;
    iii) hardening the reactive composition impregnated in the fibrous substrate by exposure to ultraviolet radiation to obtain a composite;
    iv) shaping the composite product; and
    v) crosslinking the hardened shaped composite by heat treatment at a temperature from 80° C. to 220° C. to obtain the composite moulding.

2. The process according to claim 1, wherein a quantitative ratio of the reactive resin component to the blocked di- or poly-isocyanate component is from 90:10 to 50:50.

3. The process according to claim 1, wherein the reactive resin component comprises in polymerized form:
    from 0% by weight to 30% by weight of crosslinking agents,
    from 30% by weight to 100% by weight of monomers,
    from 0% by weight to 40% by weight of prepolymers.

4. The process according to claim 1, wherein the reactive composition comprises:
    from 0% by weight to 30% by weight of blocked di- or poly-isocyanate crosslinking agents,
    from 30% by weight to 99% by weight of monomers,
    from 1% by weight to 20% by weight of urethane (meth) acrylates,
    from 0% by weight to 40% by weight of prepolymers and
    from greater than 0% by weight to 10% by weight of the photoinitiator.

5. The process according to claim 1, wherein the photoinitiator comprises at least one of a hydroxyketone and a bisacylphosphine, and a concentration of the photoinitiator is from 0.2 to 10.0% by weight.

6. The process according to claim 1, wherein the fibrous substrate comprises at least one material selected from the group consisting of glass, carbon, a plastic, a natura fibre, and a mineral material, and wherein the fibrous substrate is a textile sheet made of non-woven knitted fabrics or non-knitted structures.

7. The process according to claim 1, wherein the di- or polyisocyanate is at least one selected from the group consisting of isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI) and norbornane diisocyanate (NBDI), and the di- or polyisocyanate is blocked with at least one external blocking agent selected from the group consisting of ethyl acetoacetate, diisopropylamine, methyl ethyl ketoxime, diethyl malonate, ε-caprolactam, 1,2,4-triazole, phenol or substituted phenols and 3,5-dimethylpyrazole.

8. The process according to claim 1, wherein the reactive composition further comprises from 0.01 to 5.0% by weight of catalysts.

9. The process according to claim 1, wherein the isocyanate component further comprises uretdiones produced from at least one selected from the group consisting of isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI) and norbornane diisocyanate (NBDI).

10. The process according to claim 9, wherein:
    the blocked di- or poly-isocyanate is in a solid form at below 40° C. and in a liquid form at above 125° C., and has less than 5% by weight of free NCO groups and from 3 to 25% by weight of the uretdiones, and
    the blocked di- or poly-isocyanate further comprises from 0.01 to 5% by weight of at least one catalyst selected from a quaternary ammonium salt and a quaternary phosphonium salt having halogens, hydroxides, alcoholates, organic or inorganic acid anions as counterions.

11. The process according to claim 9, wherein the blocked di- or poly-isocyanate further comprises from 0.1 to 5% by weight of at least one co-catalyst selected from the group consisting of an epoxide, a metal acetylacetonate, a quaternary ammonium acetylacetonate, and a quaternary phosphonium acetylacetonate, and optionally further comprises known polyurethane-chemistry auxiliaries and known polyurethane-chemistry additives.

12. The process according to claim 1, wherein the resin component and the blocked di- or poly-isocyanate isocyanate component are present in a ratio in relation to one another such that for each hydroxy group of the resin component, the number of internally blocked di- or polyisocyanates of the isocyanate component is from 0.3 to 1.0.

13. A moulding produced by the process according to claim 1, comprising:
    at least one fibrous substrate, and
    at least one crosslinked reactive composition comprising a hardened (meth)acrylate resin as a matrix.

14. A boat, a ship, an aircraft, a space craft, an automobile, a bicycle, a motorcycle, a pedal cycle, an automotive, a construction, a medical device, a sporting device, an electrical device, an electronic device or a power-generating system, comprising the moulding according to claim 13.

15. A process for producing a composite moulding, comprising:
    i) preparing a reactive composition comprising:
        a (meth)acrylate monomer having one group selected from the group consisting of a hydroxyl group, an amine group and a thiol group;
        a reactive resin component based on (meth)acrylate wherein at least one constituent of the resin component has hydroxy groups, amine groups and/or thiol groups,
        a blocked di- or poly-isocyanate,
        wherein the di- or poly-isocyanate is blocked with a blocking agent or is internally blocked;
    ii) directly impregnating a fibrous substrate with the reactive composition;
    iii) hardening the reactive composition impregnated in the fibrous substrate by exposure to an electron beam or with an atmospheric-pressure plasma;
    iv) shaping the composite product; and
    v) crosslinking the hardened shaped composite by heat treatment at a temperature from 80° C. to 220° C.;

wherein when the hardening is obtained by atmospheric-pressure plasma, the plasma is generated away from the composite and is blown with high flow velocity onto the impregnated fibrous substrate.

\* \* \* \* \*